April 4, 1967 W. B. ERNST 3,312,194
HUSBANDRY APPARATUS
Filed July 13, 1965 6 Sheets-Sheet 1
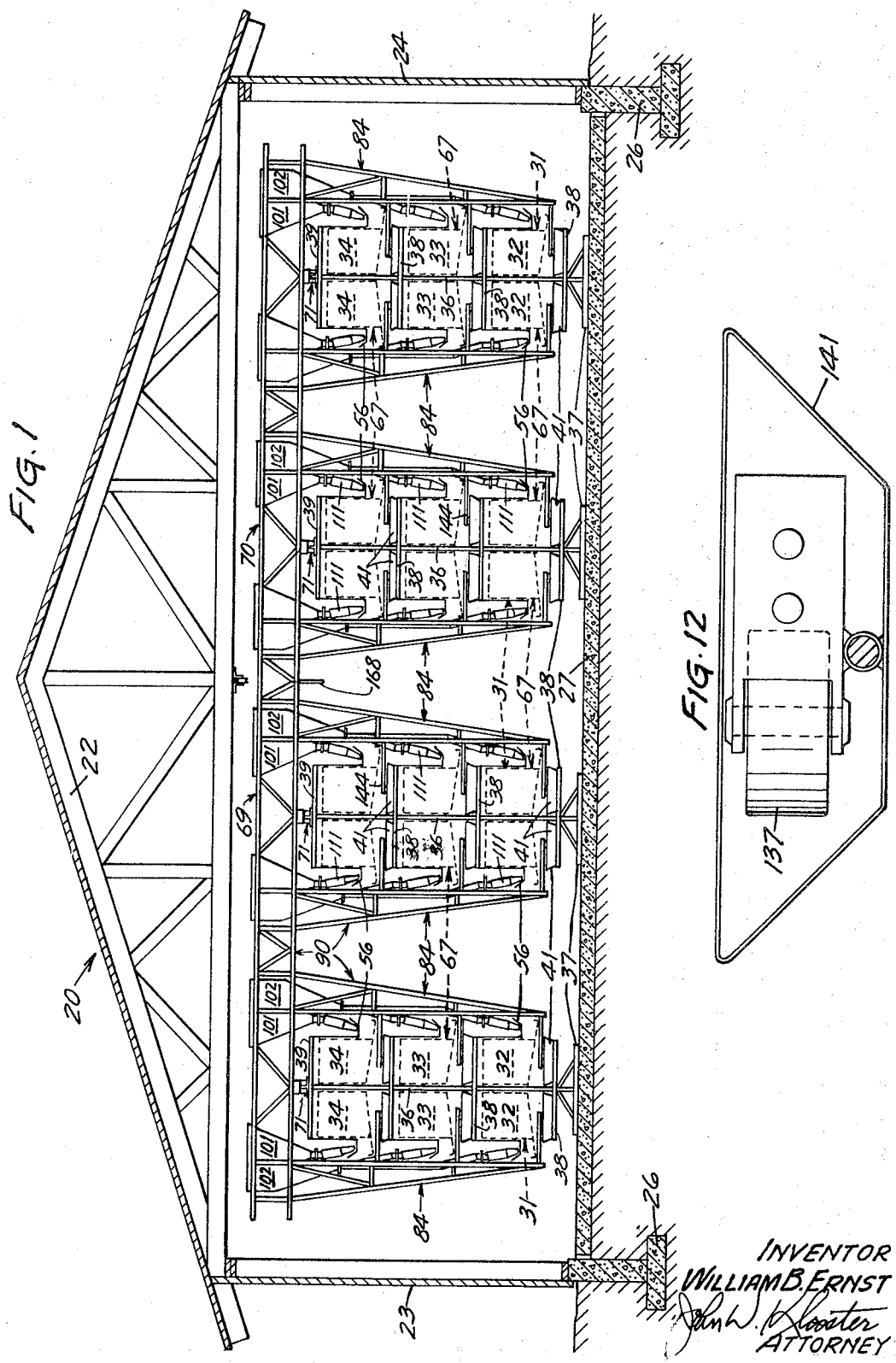
INVENTOR
WILLIAM B. ERNST
ATTORNEY

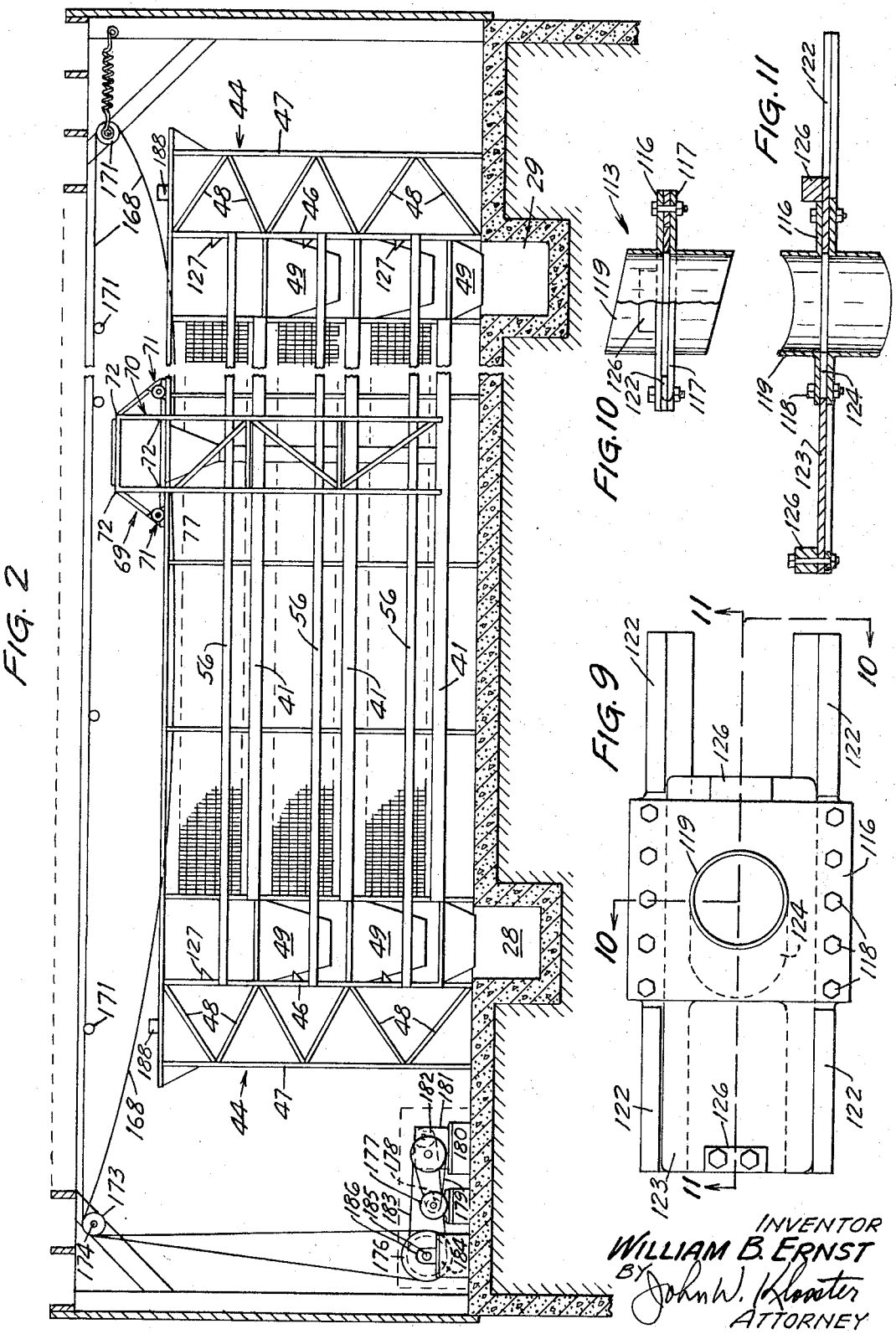

April 4, 1967 W. B. ERNST 3,312,194
HUSBANDRY APPARATUS
Filed July 13, 1965 6 Sheets-Sheet 3
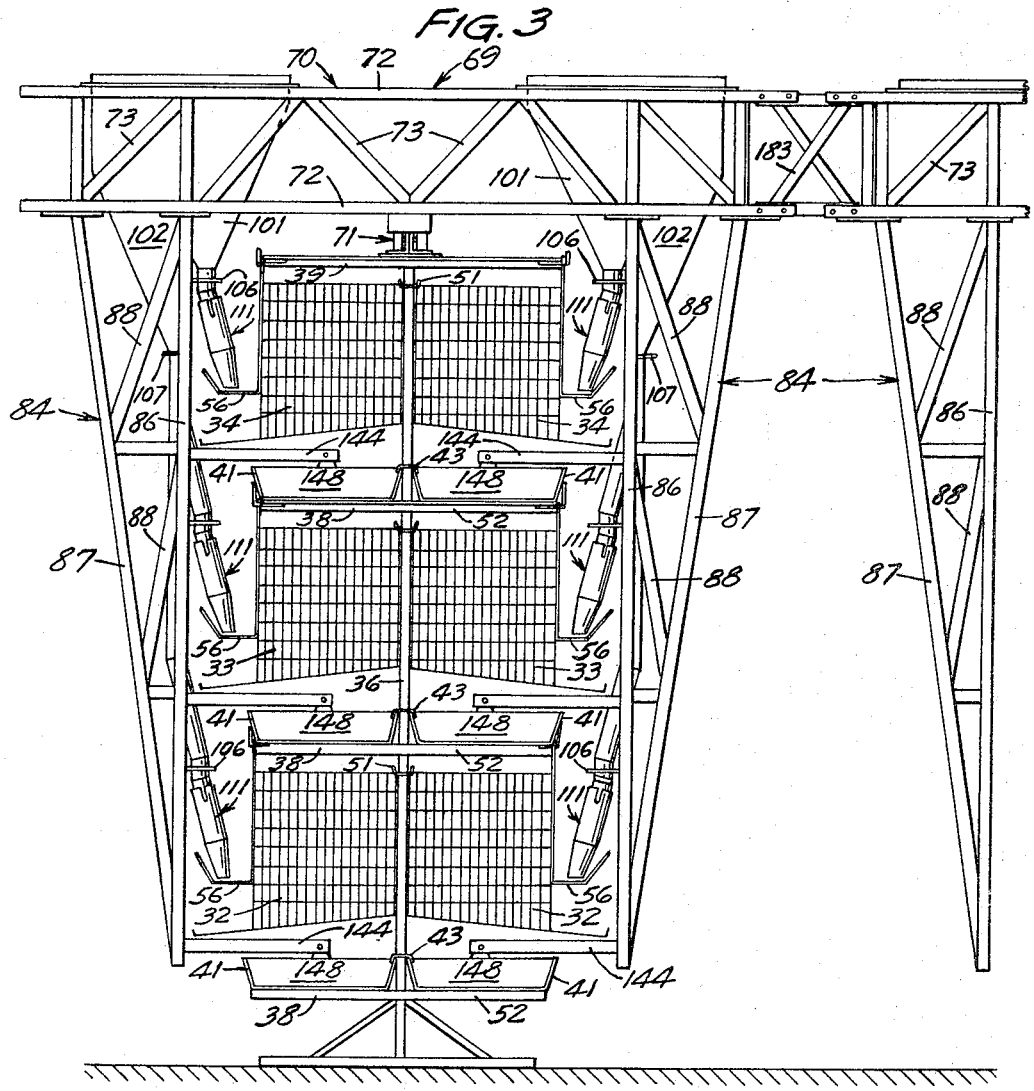
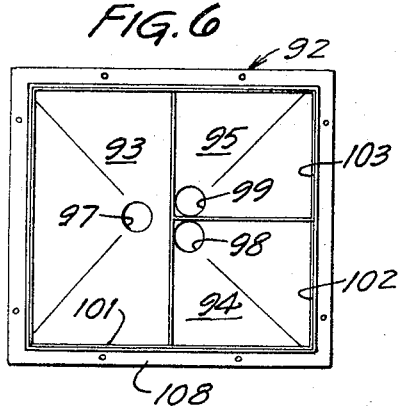
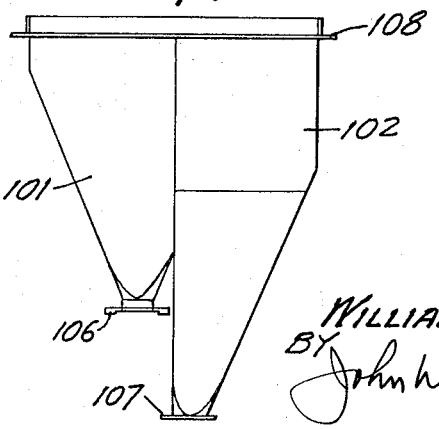
INVENTOR
WILLIAM B. ERNST
BY John W. Klooster
ATTORNEY

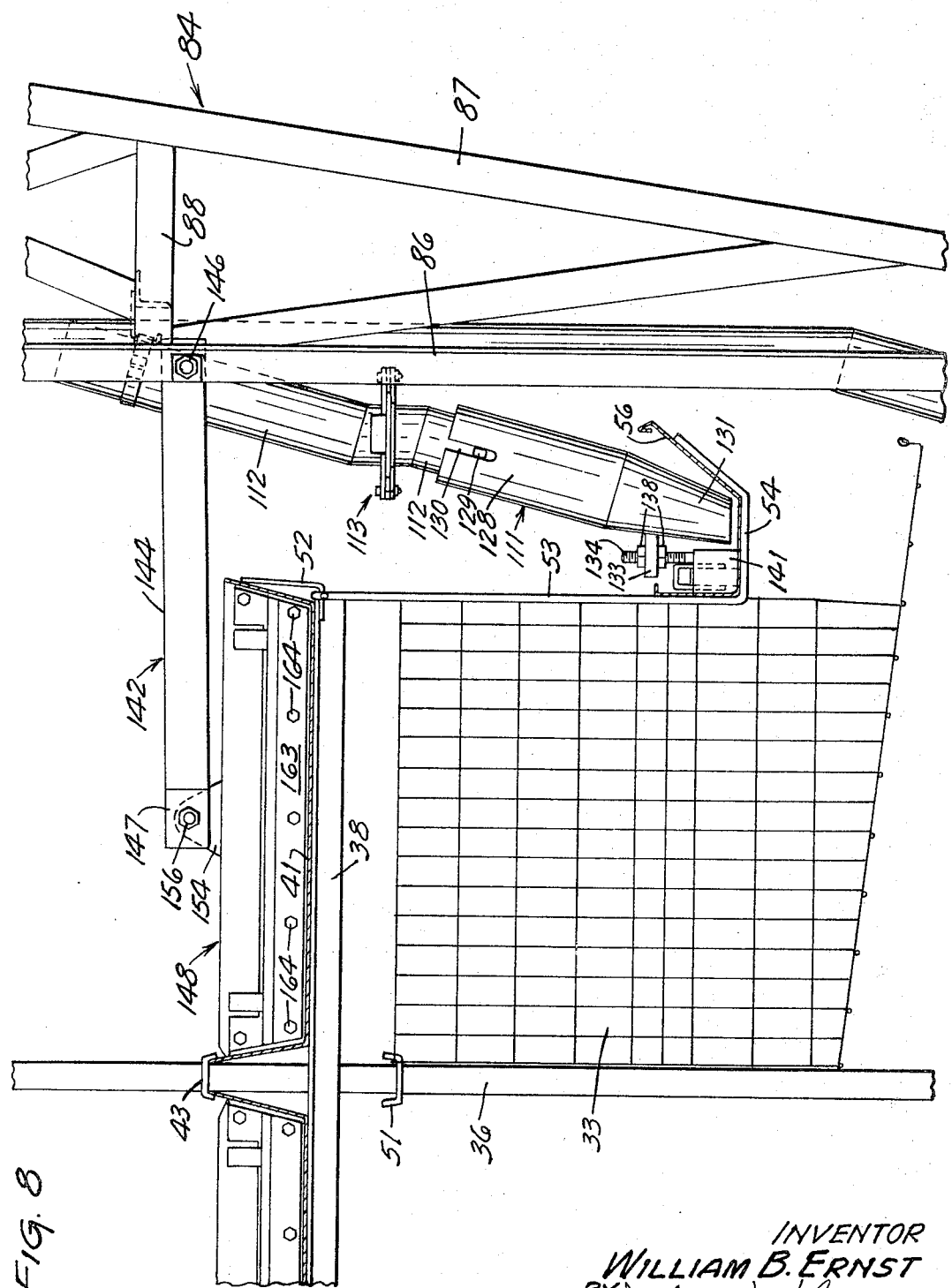

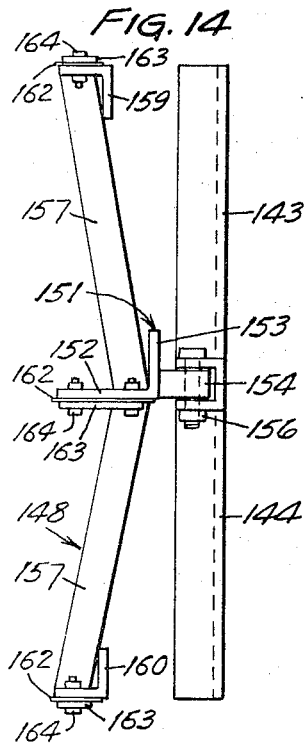
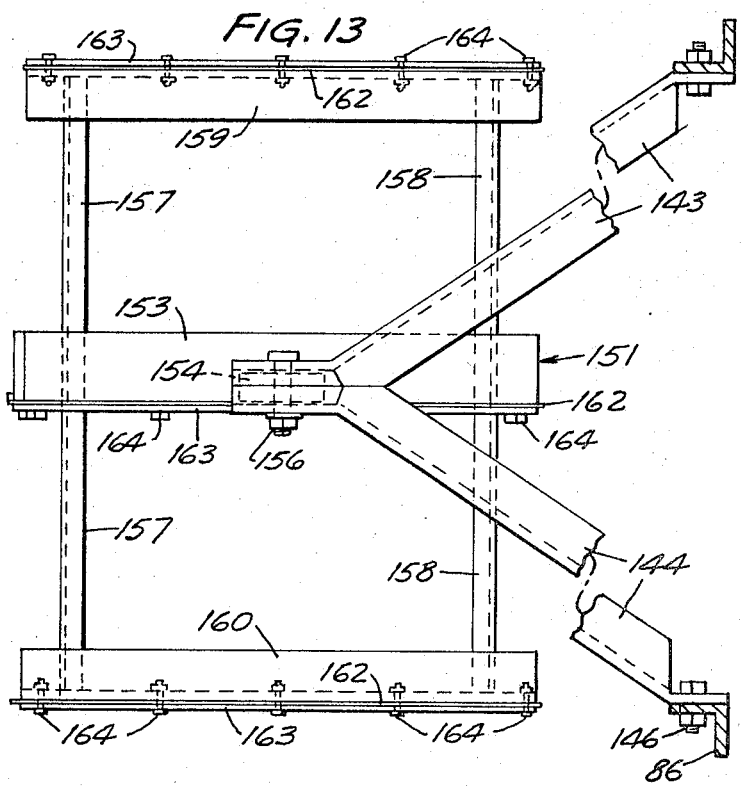
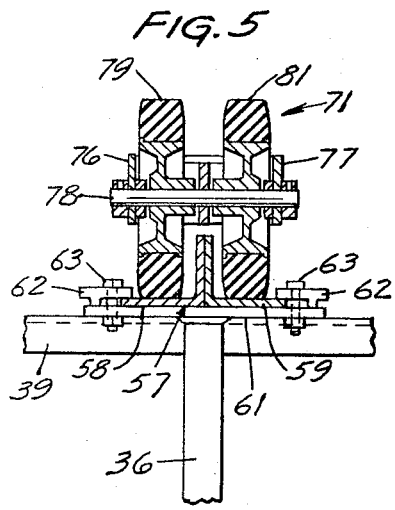
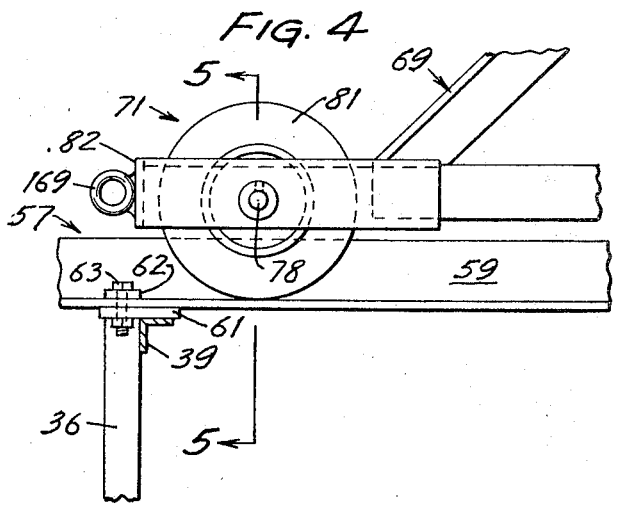

April 4, 1967 W. B. ERNST 3,312,194
HUSBANDRY APPARATUS
Filed July 13, 1965 6 Sheets-Sheet 6

INVENTOR
WILLIAM B. ERNST
BY John W. Klooster
ATTORNEY

United States Patent Office 3,312,194
Patented Apr. 4, 1967

3,312,194
HUSBANDRY APPARATUS
William B. Ernst, 540 NE. 13th St.,
Owatonna, Minn. 55060
Filed July 13, 1965, Ser. No. 471,544
10 Claims. (Cl. 119—22)

This invention relates to a new and very useful automatic unit for simultaneously distributing feed to and removing droppings from a battery of animal cages.

More particularly, this invention relates to a work unit adapted to reciprocate over and along the sides of a multideck cage layer battery, such work unit being adapted to accomplish in a single operation both the dispensing of feed for animals, especially poultry such as laying hens housed in the individual cages of the battery, and the cleaning of droppings from beneath the cages.

Heretofore many units have been proposed in the prior art for automatically caring for animals. Such devices have generally failed to meet the needs of the industry, either because they were of such complicated construction as to be impractical, or because they failed to carry out the intended operations with the degree of efficiency necessary to warrant their adoption as a replacement of the conventional manually performed equivalent operations.

It is accordingly an object of the present invention to provide an efficient and simple apparatus for the simultaneous distributing of feed to, and the removing of animal droppings from, a multideck cage layer arrangement.

It is a further object of the present invention to provide a work unit which is fairly uncomplicated and which will leave the alleyways between batteries of a multideck cage layer arrangement for animals clear of tracks, braces, etc., such that the entire house for such animals may be readily cleaned.

It is a further object of the present invention to provide a balanced, symmetrical frame arrangement adapted to traverse the multideck cage layer arrangement and one which will be supported above said arrangement for reciprocal movement back and forth along said arrangement in a predetermined operative and timed sequence.

A further object of the present invention is to provide a balanced, symmetrical and simple work unit in which a minimum of structural and functional members cooperate together to accomplish desired results, namely the husbandry of poultry and the like.

Additionally, the present invention provides, in a work unit of the class described, a novel hopper and feed dispensing unit.

Additionally, the present invention provides, in a work unit of the class described, a novel frame assembly.

Additional objects and advantages of the present invention will become more apparent to those skilled in the art from a reading of the following description, which refers to the attached drawing wherein:

FIGURE 1 is a cross-sectional view of a poultry house with a plurality of cage batteries and illustrating schematically an embodiment of a work unit formed in accordance with the present invention for servicing such batteries;

FIGURE 2 is a fragmentary longitudinal sectional view of the poultry house of FIGURE 1 and showing an elevational view of a battery being serviced by such work unit;

FIGURE 3 is an enlarged view of a work unit and a cage battery;

FIGURE 4 is a fragmentary elevational view of the transport assembly employed for a single work unit;

FIGURE 5 is a vertical sectional view taken along the line 5—5 of FIGURE 4;

FIGURE 6 is a plan view of a hopper assembly used in a work unit;

FIGURE 7 is an end view of the hopper assembly of FIGURE 6;

FIGURE 8 is an enlarged fragmentary view showing the manner in which a chute and a scraper assembly cooperate with the associated feed trough and tray of a battery;

FIGURE 9 is a detailed plan view of the feed gate for a chute of the feed dispensing means used in a work unit;

FIGURE 10 is a partial vertical sectional view taken along the line 10—10 of FIGURE 9;

FIGURE 11 is a longitudinal sectional view taken along the line 11—11 of FIGURE 9;

FIGURE 12 is a detailed plan view of a feed spout supporting mechanism;

FIGURE 13 is a plan view of a scraper assembly;

FIGURE 14 is an end elevational view of the scraper assembly shown in FIGURE 13;

Figure 17:
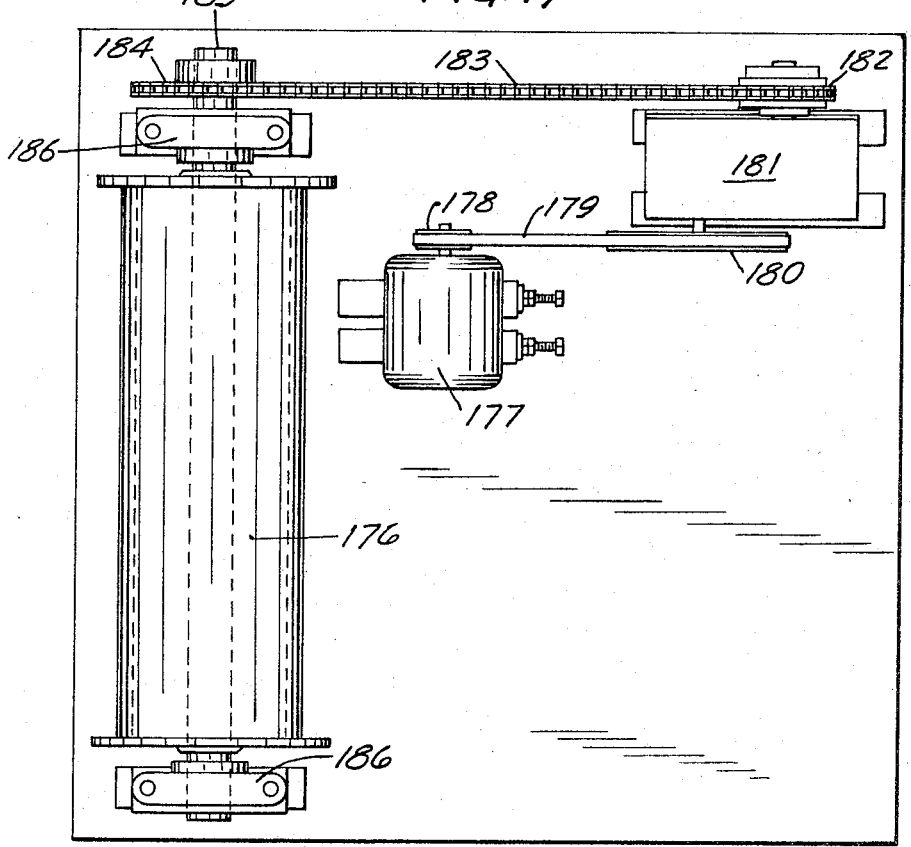
FIGURE 17 is a plan view of the power head.

Referring now to the drawings and especially to FIGURES 1 and 2, there is shown a poultry house, which is generally designated in its entirety by the numeral 20. The house 20 comprises a roof supporting truss 22, side walls 23 and 24 together with footing elements 26, and a floor 27. As the house 20 does not form a part of the present invention and may be of conventional construction it will not be described in greater detail herein.

Suitably positioned, transversely extending waste collecting gutters 28 and 29 are formed in the floor 27. These gutters 28 and 29 may be provided with suitable conveying means for removing the wastes deposited therein by the work units 90 from the batteries 31, as more particularly hereinafter set forth. The length of the house 20 will determine the number of such gutters as they should be placed longitudinally of the house at predetermined intervals.

Disposed in transversely spaced but parallel relationship to one another are a plurality of individual batteries each of which is herein designated in its entirety by the numeral 31. In the embodiment shown, each of the batteries 31 is formed of two tiers of cages, each tier having three rows of cages, one row above another. For purposes of this description, the lower row of cages in each tier is designated by the numeral 32, the middle row of cages in each tier is designated by the numeral 33, and the upper row of cages in each tier is designated by the numeral 34. The cages are supported from a plurality of vertically extending and longitudinally spaced posts 36. The posts 36 are formed of tubular stock, each being square in cross-section, and mounted on base plates 37. Extending transversely of the posts 36 and positioned in vertically spaced relation to each other are a plurality of transverse angle bars, each of which is designated by the numeral 38, and a transverse upper angle bar 39. Longitudinally extending trays each of which is designated by the numeral 41 are each supported one above each of the transverse bars 38 and are each positioned one on each side of the posts 36. These trays 41 are generally channel-shaped and have a bottom portion and inclined side portions. The trays 41 are preferably formed of sheet metal having a rust resistant and corrosion resistant coating thereon, such as porcelain or the like.

The trays 41 are preferably adhered to the transversely extending bars 38 by suitable adhesive material and the inner upstanding flange of each tray is conveniently secured to the adjacent post 38 by inverted U-shaped brackets 43 (see FIGURE 3). The trays 41 are coextensive with the cages.

Referring now to FIGURE 2, it will be observed that frame means 44 are positioned at each end of a battery 31 at positions on the opposite sides of the gutters 28 and 29 from the ends of said batteries 31. Such frame means 44 serve to stabilize the batteries 31 and each of the frame means 44 comprises a pair of vertically extending posts 46 and 47 which posts correspond generally to the posts 36. Suitable brace means 48 extend from the posts 46 and 47 to the end posts 36 of a battery 31 to give each battery 31 longitudinal stability. Positioned between the last of the vertically extending posts 36 and the posts 46 and 47 of the end frame means 44 are funnel-shaped deflecting means 49 for directing waste material pushed from the end of a tray 41 to the gutter 28 or 29.

Supported on the posts 36 and in vertically spaced relation are U-shaped support brackets 51. The brackets 51 serve as hangers for the cages and engage the cages at their inner upper edge to position the cages 32, 33 and 34 of each tier in back-to-back relation on opposite sides of said posts 36. The cages are formed of wire in a grill pattern and comprise a top, an inclined bottom, a back wall and a front wall. The cages may be divided longitudinally by transverse wall portions (not shown) to divide the cages into individual compartments and each row 32, 33 or 34 of cages is formed with an end wall (not shown). Referring again now to FIGURE 3 there is shown at each outer end of the transverse bars 38, an L-shaped support member 52. These members 52 support the outer inclined flange or wall of the trays 41 and also serve to retain downwardly-extending, trough-supporting elements 53. Each trough supporting element 53 extends downwardly from the transverse bars 38 to a point below the center of the front wall 67 of each row 32, 33 or 34 of cages and has a lower bent end portion 54 adapted to receive each longitudinally extending feed trough 56.

Each feed trough 56 is generally channel-shaped in section, as shown in FIGURES 3 and 8, having a vertical rear wall, a horizontal bottom and a downwardly sloping front wall. The feed troughs 56 extend beyond the ends of the rows 32, 33 and 34 of cages in each battery and have their end portions supported by suitable hangers 53 supported from the posts 46 and 47 of the frame means 44.

Extending longitudinally of the batteries 31 and connecting the upper ends of the posts 36 is a rail 57 (see FIGURES 3, 4 and 5). This rail 57 comprises a pair of angle beams 58 and 59 each having one flange thereof disposed horizontally and each having the other flange thereof extending vertically and in abutting relation with the corresponding flange of the other angle beam. These beams 58 and 59 are anchored to the tops of the posts 36. The tops of the posts 36 are provided as aforedescribed with transverse angle bars 39 and with an anchor plate 61. Suitable retaining clips 62 secure the angle beams 58 and 59 onto the anchor plates 61 by means of bolt and nut assemblies 63.

Each work unit 90 of this invention employs a carriage means 69. Carriage means 69 is mounted on the rail 57 for movement therealong. The carriage means 69 may have an extent such that it extends across the width of one battery 31 or the carriage may extend transversely of a plurality of batteries 31 in the manner shown for example in FIGURE 1. The carriage means in general comprises a frame 70 and transport means 71 which cooperate with rails 57. The frame 70 comprises four transversely extending and spaced angle members 72 which define a box-like frame in longitudinal section. The frame members 72 are joined by vertically extending and longitudinally extending brace members 73. The frame means 70 also include longitudinally extending plates 76 and 77 (see FIGURES 4 and 5). The members 76 and 77 extend longitudinally beyond the box-like frame 70, adjacent the bottom thereof, and between their opposite ends are journaled, on appropriate shafts 78, a pair of wheels 79 and 81. As seen in FIGURE 5, the wheel 79, of each pair of wheels, rides on the angle beam 58 and the wheel 81, of each pair, rides on angle beam 59. A transversely extending bar 82 joins the ends of the longitudinally extending plates 76 and 77 to maintain said plates in a fixed spacial relation with respect to each other.

Depending from the carriage 69 is a plurality of frame means each designated by the numeral 84. The frame means 84 are usually paired and are transversely spaced. Each frame means 84 is adapted to cooperate with a row 32, 33 or 34 of cages of a battery 31. Each frame means 84 comprises a pair of longitudinally spaced, vertically depending frame members 86, which are positioned adjacent the front of said cages, and a pair of depending, inclined struts 87 which join at their lower ends with the lower ends of the frame members 86. The frame members 86 and the struts 87 form an inverted A-shaped frame assembly in end view and a frame of rectangular shape in plan view. Cross-bracing is conveniently provided between the frame members 86 and struts 87 by bar 88 so as to give each frame means 84 suitable strength.

A single work unit 90 has a pair of frame means 84 downwardly depending from opposite end portions of a carriage means 69. The arrangement is such that one frame means 84 depends in front of one side of a battery 31 and the other frame means 84 depends in front of the opposite side of such battery 31.

In a single work unit 90, a hopper assembly 92 is supported within each frame means 84 so that there is a pair of hopper assemblies 92 for each work unit 90. Each hopper assembly 92 is internally divided into separate chambers, and, in the embodiment shown, each assembly 92 is divided into three chambers, each chamber being designated individually by the respective numerals 93, 94 and 95. Each of these chambers 93, 94 and 95 are formed to receive and hold substantially the same volume of feed. A hopper assembly 92 is formed of suitable sheet material, such as galvanized steel or the like.

The hopper assembly 92 shown in the embodiment being described is formed of three separate sheets of material which are each suitably bent, cut, and folded to form the desired hopper assembly, in this case, one having a rectangular upper open end, divided into three rectangular chambers 93, 94 and 95 each of which terminates in a funnel-shaped bottom portion having a lower circular opening.

The metal formed to define the hopper assembly 92 consists of three sheets of material bent and formed to provide upper or side edges U-shaped in plan. The chamber 93 is thus defined by one U-shaped member 101 extending around three sides of the chamber 93, a second piece 102 of generally U-shape which forms the fourth or inside wall of the chamber 93 and three sides of the chamber 94, and a third sheet 103 of generally U-shape which forms the fourth wall of the chamber 94 and three sides of the chamber 95. The lower portions of each of the members 101, 102 and 103 are shaped to terminate in the openings 97, 98 and 99 around which are secured suitable fastening flanges. The flanged member secured to the lower end of the chamber 93 is the upper supporting plate for a feed valve which can be of the type to be described in greater detail hereinafter. Flanges 107 (one of which is shown) formed around the openings 98 and 99 for the chambers 94 and 95 provide for the attachment of similar flanges affixed to one end of each feed chute. Encircling the feed hopper assembly 92 around its upper open edge is a rectangular frame 108 which adapts the hopper assembly 92 for attachment within the frame means 84.

Depending from each feed chamber 93, 94 and 95 is a feed dispensing assembly 109. Each feed dispensing assembly 109 functions to dispense feed from its associated hopper into the feed troughs 56. Each feed dispensing assembly 109 is so constructed as to dispense feed in a uniform, even amount into the respective troughs 56 as the entire assembly or work unit 90 passes along a battery 31. Each feed dispensing assembly 109 includes a feed dispensing nozzle portion 111 which telescopically fits over a pipe or chute 112 associated with each particular chamber 93, 94 and 95.

It will be appreciated that the length of a chute 112 is suitably varied so as to adapt the nozzle 111 to rest in the bottom of a trough 56. Contained within each chute 112 is a feed gate or valve 113. This valve 113 is so constructed as to allow feed to flow through the chute 112 to nozzle 111 for distribution in a trough 56. The valve 113 thus operates between open and closed positions as those skilled in the art will appreciate. Referring to FIGURES 9, 10 and 11 the features of a feed valve 113 will be described. Each valve 113 contains an upper plate 116 and a lower plate 117. Upper plate 116 and lower plate 117 are suitably secured together by suitable fastening means, for example, as shown in the figures, bolt and nut assemblies 118. Secured to each plate 116 and 117 is a cross-sectionally circular tubular section 119 to which chute portions or pipes 112 are attached.

The lower plate 117 has its opposite longitudinally extending side edges folded back upon the plate as at 122 to form a channel-shaped guide. Between the edge portions of each guide 122 is a gate 123. The gate 123 is a flat, rectangularly-shaped member formed with an opening 124. The size of opening 124 is equal to or larger than the diameter of the tubular sections 119. On each end of the gate 123 are abutment and stop members 126 which are adapted to limit gate 123 movements between open and closed positions, and which are adapted to abut against projections 127 (FIGURE 2) positioned at opposite end portions of batteries 31 and supported by the frame means 44. Thus, as a work unit 90 traverses reciprocatorily the length of a battery 31, the abutments 126 strike the projections 127 to either open or close the gates 123, thereby permitting or interrupting the flow of feed to the dispensing nozzles 111, as the case may be. If it is desirable to discontinue feeding for designated hours of the day or night the projections 127, at the end of the batteries which open the feed gates 123, may be swung to an out of the way position so the gates remain closed. Suitable switching means may also be provided to simultaneously disable the automatic hopper filling apparatus. Control of feed flow is thus achieved.

Referring again to FIGURE 8, the nozzle 111 is cross-sectionally circular, but has its upper end portion 128 so engaged with the chute 112 as to be telescopically received thereover in a non-rotatable manner. Such non-rotatability is obtained by means of a key 129 secured to the chute 112. The key 129 is adapted to engage appropriately sized key ways 130 which extend longitudinally or axially of the nozzle 111 from the upper edge portion of the upper end 128. The lower end portion 131 of nozzle 111 is compressed or flattened so as to form an orifice which is generally elliptical-shaped.

Secured to one flattened side of lower portion 131 of nozzle 111 (each nozzle) is a caster assembly herein-designated in its entirety by the numeral 132. This caster assembly 132 is supported from a flattened side of the lower nozzle portion 131 by a bracket 133 secured to said flattened side. Through the bracket 133 projects a leg 134 having a threaded outer surface. The lower portion of leg 134 is secured to a side wall of an inverted U-shaped frame 135 which supports between its side walls a horizontally extending axle 136. Journalled on the axle 136 is a caster wheel 137. Nuts 138 threadably received on the leg 134, above and below the bracket 133, provide a means for vertically raising or lowering the wheel 137 relative to the lower end of the nozzle 111. Observe that the wheel 137 is adapted to ride in the bottom of a trough 56 thereby to space the lower portion 131 of nozzle 111 in a fixed spaced relationship to the bottom of a trough 56, thereby to control the amount of feed flowing from the nozzle 111 into a trough 56. Surrounding a wheel 137 is a plow 141 which is adapted to scrape away feed in a trough 56 in advance of the passage of a wheel 137 as the work unit 90 moves along in the front of the battery 31. The plow 141 is secured to the leg 134 and is supported therefrom.

Referring to FIGURES 8, 13 and 14, there is seen a support arm assembly 142. A plurality of support arm assemblies are attached to each frame means 84 and extend therefrom toward the associated cages. Each support arm assembly 142 comprises a pair of angle members 143 and 144 each having one end thereof pivotally connected to a frame member 86 and converge from said frame members 86 toward a point positioned above an associated tray 41. The angle members 143 and 144 are pivoted to the frame members 86 by means of nut and bolt assemblies 146. The converging ends of the members 143 and 144 are secured together and the vertical flanges thereof extend laterally to form an extension defining an eye 147.

Pivotally secured to each arm assembly 143 at the eye 147 is a scraper blade assembly generally designated 148. The scraper assembly 148 comprises a transversely extending center angle bar 151 having a vertical flange 152 and a horizontally extending flange 153. An ear 154 is secured to and extends upwardly from the center portion of the flange 153. A bolt and nut assembly 156 extends through the ear 154 and the eye 147 to pivotally connect the scraper assembly 148 to the members 143 and 144. Secured to the angle bar 151 and extending longitudinally to each side thereof are a pair of braces 157 and 158. The outer ends of the braces 157 and 158 are secured to transversely extending angle members 159 and 160 which extend transversely of the trays 41 and parallel to the bar 151. Each of the angle bars 151, 159 and 160 supports a scraper plate 162 preferably formed of a smooth-surfaced, resilient material. These plates 162 are generally trapezoidal-shaped to slidably engage the lower surface and inclined side edges of the trays 41. The plates 162 are suitably secured to the vertical flanges of the angle bars 151, 159 and 160 by support plates 163 with bolt and nut assemblies 164.

As the work pit 90 traverses the battery 31, the scraper assemblies 148 move through the trays 41 to remove the droppings from said trays. It will be appreciated that, as the leading angle bar 159 or 160 and its associated scraper plate 162 scrapes up a pile of droppings, some of the droppings carry over the upper surface of a lead angle bar 151 and collect in advance of the center scraper plate 162. From there, the droppings are transferred to the end of the trays 41 and are discharged through the dispenser chutes 49. The frequency of reciprocation of the work units 90 and the length of the trays before reaching a discharge point for the dropping are preferably preset to provide the most efficient operation of the scraper blade assemblies 148.

Figure 15:
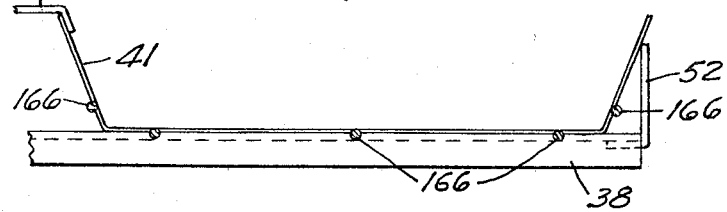
FIGURE 15 is a detail sectional view of the litter tray.

At the end of each tray 41 and extending over the upper surface of the chutes 49 are transversely spaced and longitudinally extending rods 166 (see FIGURES 2 and 15) which have their upper surfaces, generally coterminous with the upper surfaces of the trays 41. Thus, as a work unit 90 moves past a chute 49, the droppings fall through the rods but the scraper assemblies 148 pass thereover and maintain their position with respect to the surface of the trays 41.

The ends of the rods 166 are preferably notched to permit the rods 166 to extend under the ends of the trays 41, and afford a suitable fastening as by spot welds. When a battery 31 is long, one or several gutters such as 28 and 29 may be spaced along said battery. Over such additional gutters 28 or 29 the trays 41 are discontinued, and rods 166 are inserted thereby bridging the ends of the trays 41 at such points.

Figure 16:
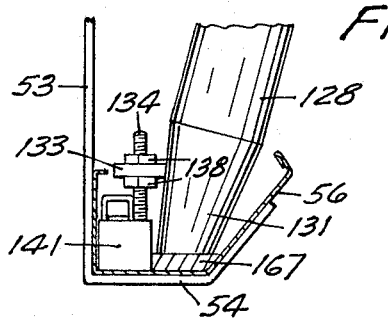
FIGURE 16 is a detail view of the feed trough in an area between rows of cages at each end of the troughs.

When it is necessary to include additional gutters 28 or 29, and at the ends of the feed troughs 56 which extend beyond the cages, it is desirable not to dispense and feed from the nozzle 111. For this purpose, referring now to FIGURE 16, a length of material 167, such as wood, is placed in the trough 56. This piece of wood 167 has inclined ends and the lower end 131 of the nozzle 111 will ride up onto the material 157, thus closing off the dispensing opening while the work unit 90 traverses this section of the trough 56.

Referring now to FIGURES 1, 2, 4 and 17, the means for reciprocating the carriage means 69 and associated frame means 48 over a battery 31 will be described. Such reciprocation can be conveniently achieved by a drive means. One suitable drive means comprises a cable 168 having one end thereof attached to one end of the transport mechanism 71 of the frame 70. This cable 168 is adapted to be attached to each end of the transport assembly 71 by means of an eye 169 (which can be secured as by weldments to the transverse bars 82 positioned at each end of the transport assembly 71). The cable 168 extends from one end of the transport assembly 71 over an idler pulley 171 rotatably mounted at one end of the house 20 (the upper righthand corner of FIGURE 2) on the end of a tension spring which serves to take up slack. The cable 168 then extends over the upper portion of the battery 31 across the other cable supports or idler pulleys 172 positioned in spaced relation along the top of a said battery 31. At the opposite end of such battery 31 is a pair of idler pulleys 173 rotatably mounted on a single shaft 174 which pulleys 173 support the cable 168 vertically above the power source and the cable extends therefrom down and around a driven winding and release drum 176. A suitable power means for driving the drum 176 includes a reversible motor 177, having a drive pulley 178. A belt 179 is driven from the pulley 178 and drives the input pulley 180 of a gear reduction unit 181 having for example a 200:1 ratio. A torque transmitting drive sprocket and slip clutch 182 on the output side of the reduction unit 181 drives a roller chain 183 which extends around a sprocket wheel 184. The sprocket wheel 184 is fixed to a drive shaft 185 of the drum 176. The shaft 185 is supported along its length by pillow blocks 186.

Rotation of the drum 176 in opposite directions simultaneously winds and unwinds the cable 168 therefrom to reciprocally move the work unit 90 back and forth along the rail 57 positioned above the battery 31. A suitable conventional electric circuit is provided to control the motor 177 and said circuit includes a pair of microswitches 188 and 189 located one at each end of the battery 31. The switches 188 and 189 are also connected to timers (not shown) which determined the cycle time of the work unit 90 and which effect reversal of the motor. The rate of reciprocation is controlled in a predetermined manner so as to afford the distribution of feed and the removal of droppings at regular intervals to maintain feed in the troughs 56 and to keep the trays 41 substantially cleared.

At one end of the battery 31 suitable feed storage and dispensing means are provided such that at one end of each battery 31 each hopper assembly 92 is disposed with respect to the feed storage means such that the chambers 93, 94 and 95 of the hopper assembly 92 are filled with feed at predetermined intervals. The control of the feed storage and dispensing means is also controlled by the microswitch 188 at the end of the battery.

A single work unit 90 reciprocating on the single rail 57 provides an operative unit for feeding animals disposed in the cages and for removing the droppings from the cages. This work unit 90 is symmetrical and balanced so that, during movement of the unit 90 in carrying feed and scraping the trays, it maintains its position on rail 57 throughout its movements from one end of a said battery 31 to the other. The scraper assembles 148 provide auxiliary guide means for the depending frame sections 84, and the longitudinal spacement of the transport wheels 79 and 81 of the transport assembly 71 prevent the unit 90 from excessive tipping, tilting or yawing such that a unit 90 maintains the predetermined attitude throughout its traversing movements.

Referring to FIGURES 1 and 3, there is illustrated a plurality of work units 90 joined together overhead across the alleys between batteries 31. These work units 90 are joined by means of bridging frame assemblies 191 which join adjacent ends of frames 70. The bridging frame assemblies 191 comprise horizontally extending struts 192 which join at their respective opposite end portions to the transversely extending angle members 72 of each carriage means 69. Suitable bracing 193 is used in conjunction with these struts 192 so that the resulting structure is rigid and completes a carriage extending the width of house 20.

Thus, all work units 90 in house 20 are interlocked together to move or reciprocate over and about batteries 31 by means of a single power means such as described above. A suitable structural arrangement is shown in FIGURE 1 and in such arrangement, the cable 168 is attached at opposite side portions of a bridge frame assembly 191. The illustration of FIGURE 1 demonstrates the invention being used with an even number of work units 90 so that the cable 168 is attached to the center of a bridge assembly 181. When an odd number of work units 90 are joined together by bridging frame assemblies 191, it will of course be appreciated that the cable 168 is attached in the same manner as with a single work unit 90, that is, to the opposite ends of the center transport 71 of the center work unit 90.

Having thus described an embodiment of the present invention it is to be understood that certain modification may be made in the same without departing from the spirit or scope of the invention.

What is claimed is:

1. A work unit for use with a multideck cage layer battery, said battery comprising at least two tiers of cages in back to back relation, each tier comprising at least two rows of cages one above another, each row of cages including a tray disposed therebeneath for collecting droppings and a feed trough disposed on one side thereof and extending longitudinally along each row adjacent a side thereof, central support means supporting said cages in vertically spaced relation, said work unit comprising:
   (a) a rail mounted on said central support means and extending longitudinally and generally parallel to said rows of cages,
   (b) a carriage having suitable transport wheels mounted on said rail means for movement along said rail means, said carriage means extending transversely of said rail means and beyond each side of said cages,
   (c) frame means mounted on each end of said carriage means and depending downwardly therefrom across the front of the cages in each tier, said frame means and said carriage means providing a symmetrical frame means around three sides of said battery,
   (d) feed hopper means supported within said frame means, said hopper means being divided into sections, each section having a downwardly extending chute connected to the bottom thereof and each chute being formed with feed dispensing means and positioned in a different one of said feed troughs,
   (e) scraper means disposed within each tray for guiding said frame means and having arm means extending from the upper side of said scraper means to said frame means to support said scraper means for movement through said trays in response to movement of said frame means and said carriage means along said rail means, and
   (f) drive means including cable means connected to each side of said carriage means for moving said carriage means back and forth along said rail means.

2. A poultry husbandry assembly comprising a plurality of multideck cage layer batteries extending generally parallel with respect to each other and each battery comprising two tiers of cages, each tier having at least two rows of cages one above another, each row of cages including a tray disposed therebeneath for collecting droppings, and a feed trough disposed on one side thereof and extending longitudinally along said row adjacent a side thereof, support means positioned between said tiers of cages for supporting the tiers of each battery and for supporting said trays and troughs, a work unit associated with each of said batteries for distributing feed in said troughs and for removing the droppings from said trays, said work unit comprising:

(a) rail means positioned above and generally centrally of each battery and extending generally parallel with the rows of cages,
(b) a U-shaped frame having the bight portion thereof mounted on said rail means for moving said frame along said rail means, each depending arm of said frame means supporting therewithin hopper means from which separate chutes are directed to a different one of said feed troughs,
(c) arm means extending laterally from said depending arm portions and extending laterally therefrom under said cage means and having scraper means formed on the lower end of said arm means and cooperating with said trays for scraping the same and for guiding said frame,
(d) means rigidly connecting each said work unit for movement of the work unit associated with each said battery in unison, and
(e) a single drive means including a cable attached to the unitarily joined work units for movement of said unit longitudinally of said batteries.

3. In an automatic feed dispensing apparatus which travels along a feed trough, a dispensing device comprising a tubular feed chute having a discharge end,
nozzle means telescopically and movably mounted over said end of the chute and having a lower dispensing end generally elliptically-shaped in cross section,
said chute and said nozzle means being formed with cooperating means to prevent relative rotation therebetween,
a caster assembly secured to said nozzle means at a side thereof, said caster assembly being vertically adjustable relative to said nozzle means and comprising
a rotatable member,
a plow-like frame extending around said member and adapted to extend along a said trough and having its opposite ends formed in converging planes affording means to move any feed which may be within a said trough toward said dispensing end of said nozzle means as said dispensing device reciprocates in a said trough.

4. In an automatic feed dispensing apparatus adapted to travel along a multideck cage battery, each deck having a feed trough extending therealong, a feed hopper and dispensing unit comprising a compartmentalized hopper having at least three chambers, each said chamber having an inclined lower portion terminating in an opening,
at least three tubular chutes secured to and communicating with a different one of said chambers through its associated opening, each chute having a different length and a discharge end so one of said chutes communicates with a different trough of a said battery,
a nozzle telescopically and movably mounted over said discharge end of each said chute and having a lower dispensing end generally elliptically-shaped in cross section, each said chute and associated nozzle being formed with cooperating means to prevent relative rotation therebetween,
transport means affixed to each said nozzle at a side thereof, said transport means being vertically adjustable relative to its associated nozzle and comprising
a rotatable wheel,
a plow-like frame extending around said wheel and adapted to extend along a said trough and having end portions disposed in converging planes to move any feed which may be within a said trough toward said dispensing end of said nozzle.

5. A device according to claim 3 wherein a feed control valve is disposed in said chute which is movable between an open and closed position.

6. A poultry husbandry assembly comprising in combination, (A) a multideck cage layer battery, said battery comprising
(1) a central supporting structure,
(2) a plurality of rows of cages supported on each side of said structure and arranged in tiers,
(3) a channel-shaped manure tray extending longitudinally below each row of cages and being supported by said structure,
(4) a feed trough extending longitudinally along the outer side of each row of cages, and
(B) a rail supported by said structure above and generally centrally between said tiers, and
(C) a work unit comprising
(1) a carriage extending transversely of said rail and said tiers of cages,
(2) transport means supporting said carriage on said rail for movement therealong,
(3) frame means extending downwardly from said carriage along the outer side of each tier of cages defining with said carriage a symmetrical inverted U-shaped frame and adapted to support feed hopper and dispensing means for carrying feed to and dispensing it in each said trough,
(4) arm means pivotally mounted for only vertical movement on said frame means and extending laterally therefrom to a position vertically above each said tray,
(5) scrapper means extending transversely of each tray, said scrapper means including a pair of longitudinally spaced blades fitted between the sides of a channel-shaped tray and connected to said arm means,
whereby said transport means and said scraper means coact to provide transport and guide means for said work unit and said scrapper means function to scrape the bottom of said trays during longitudinal movement of said unit with respect to said battery.

7. The assembly of claim 6 wherein each said manure tray has generally parallel rods fixed to the bottom portion and sides thereof which extend longitudinally from each end of said trays to support said scrapers and guide said work unit as the carriage and frame means thereof are moved beyond the end of said trays to dump scrapings cumulated thereby from the trays.

8. The assembly of claim 6 wherein each said scraper means comprises scraper frame means supporting said spaced blades, said scraper frame means having a pivotal connection generally centrally thereof with said arm means by a pivot pin the axis of which extends longitudinally of said tray.

9. The assembly of claim 6 wherein said structure comprises a single row of spaced posts each having transversely extending bars for supporting said trays and said troughs and V-shaped brackets for supporting said cages, with said rail being supported above said posts.

10. A poultry husbandry assembly comprising in combination,
(A) a plurality of multideck cage layer batteries extending generally parallel with respect to each other, each battery comprising
  (1) a central support structure including longitudinally spaced posts,
  (2) two tiers of cages supported from said posts, one tier on each side thereof, each tier having at least two rows of cages one above another, a tray disposed beneath each row of cages and supported by said structure for collecting droppings, and a feed trough supported by said structure and disposed on one side of each row and extending longitudinally along said row,
(B) a longitudinally extending rail supported above said support structure of each battery and above said cages,
(C) a work unit associated with each of said batteries for distributing feed in said troughs and for removing droppings from said trays, each said work unit comprising:
  (1) a carriage extending transversely of each battery,
  (2) means supporting said carriage on each said rail for movement therealong,
  (3) a frame extending downwardly from said carriage adjacent each side of each tier,
  (4) hopper means supported within each said frame, said hopper means including separate hoppers for each row of cages and a chute directed from each hopper to a different one of said feed troughs,
  (5) arm means each attached at one end to said frames for vertical pivotal movement relative thereto and extending from said frames laterally under each row of cages and scraper means affixed to the other end of said arm means and cooperating with said trays for scraping the same,
(D) means rigidly connecting adjacent ends of each carriage together, and
(E) A single drive means including a cable attached to said connected work units for movement of said units longitudinally of said batteries.

References Cited by the Examiner
UNITED STATES PATENTS

| | | | |
|---|---|---|---|
| 2,369,316 | 2/1945 | Scott | 119—22 X |
| 2,797,663 | 7/1957 | Bailey | 119—52 |
| 2,987,038 | 6/1961 | Cole | 119—18 |
| 3,109,413 | 11/1963 | Patchett | 119—48 |
| 3,124,101 | 3/1964 | Wierenga | 119—22 |
| 3,126,871 | 3/1964 | Byrnes | 119—52 |
| 3,158,137 | 11/1964 | Summerour | 119—22 |
| 3,164,128 | 1/1965 | Arledge | 119—18 |

SAMUEL KOREN, *Primary Examiner.*
HUGH R. CHAMBLEE, *Examiner.*